United States Patent [19]

Fingeroot

[11] 4,022,172

[45] May 10, 1977

[54] MANIFOLD HEAT EXCHANGER

[75] Inventor: Max Fingeroot, Oak Park, Mich.

[73] Assignee: American Motors Corporation, Detroit, Mich.

[22] Filed: Dec. 29, 1975

[21] Appl. No.: 644,676

[52] U.S. Cl. .................. 123/122 AC; 123/122 AB; 123/122 H; 165/105; 261/144; 261/145

[51] Int. Cl.² ...................................... F02M 31/00

[58] Field of Search ............. 123/122 AC, 122 AB, 123/122 H, 133; 261/144, 145; 165/52, 105

[56] References Cited

UNITED STATES PATENTS

| 1,990,662 | 2/1935 | Moore | 123/122 AC |
|---|---|---|---|
| 3,763,838 | 10/1973 | Lindsay et al. | 261/144 |
| 3,935,849 | 2/1976 | Mills | 165/105 |
| 3,963,012 | 6/1976 | Harned | 123/122 AC |
| 3,964,460 | 6/1976 | Nakano | 123/122 AB |
| 3,977,378 | 8/1976 | Harned | 123/122 AC |

Primary Examiner—Ronald H. Lazarus
Attorney, Agent, or Firm—Reising, Ethington, Barnard, Perry and Brooks

[57] ABSTRACT

A manifold heat exchanger for an internal combustion engine is disclosed as including an enclosed liquid receptacle having a heat receiving portion projecting into an exhaust manifold and a heat dissipating portion projecting into an associated intake manifold. The receptacle is partially filled by a quantity of liquid that is vaporized by heat from the exhaust gases flowing over the heat receiving portion of the receptacle. The vaporized liquid transfers heat to the heat dissipating portion of the receptacle so as to heat a combustible charge flowing within the intake manifold. The intake manifold is preferably located above the exhaust manifold so that gravity normally positions the unvaporized liquid within the heat receiving portion of the receptacle. The liquid receptacle also preferably has a mushroom shape with an elongated lower portion defining its heat receiving portion and a partially spherical upper portion that defines the heat dissipating portion. The spherical heat dissipating portion is impinged by the combustible charge as it enters the intake manifold so as to provide the heating of the charge. A heat shield located within the exhaust manifold concentrates the heat exchange from the exhaust gases to the heat receiving portion of the receptacle. A common attachment member secures both the receptacle and the heat shield to the manifolds.

13 Claims, 1 Drawing Figure

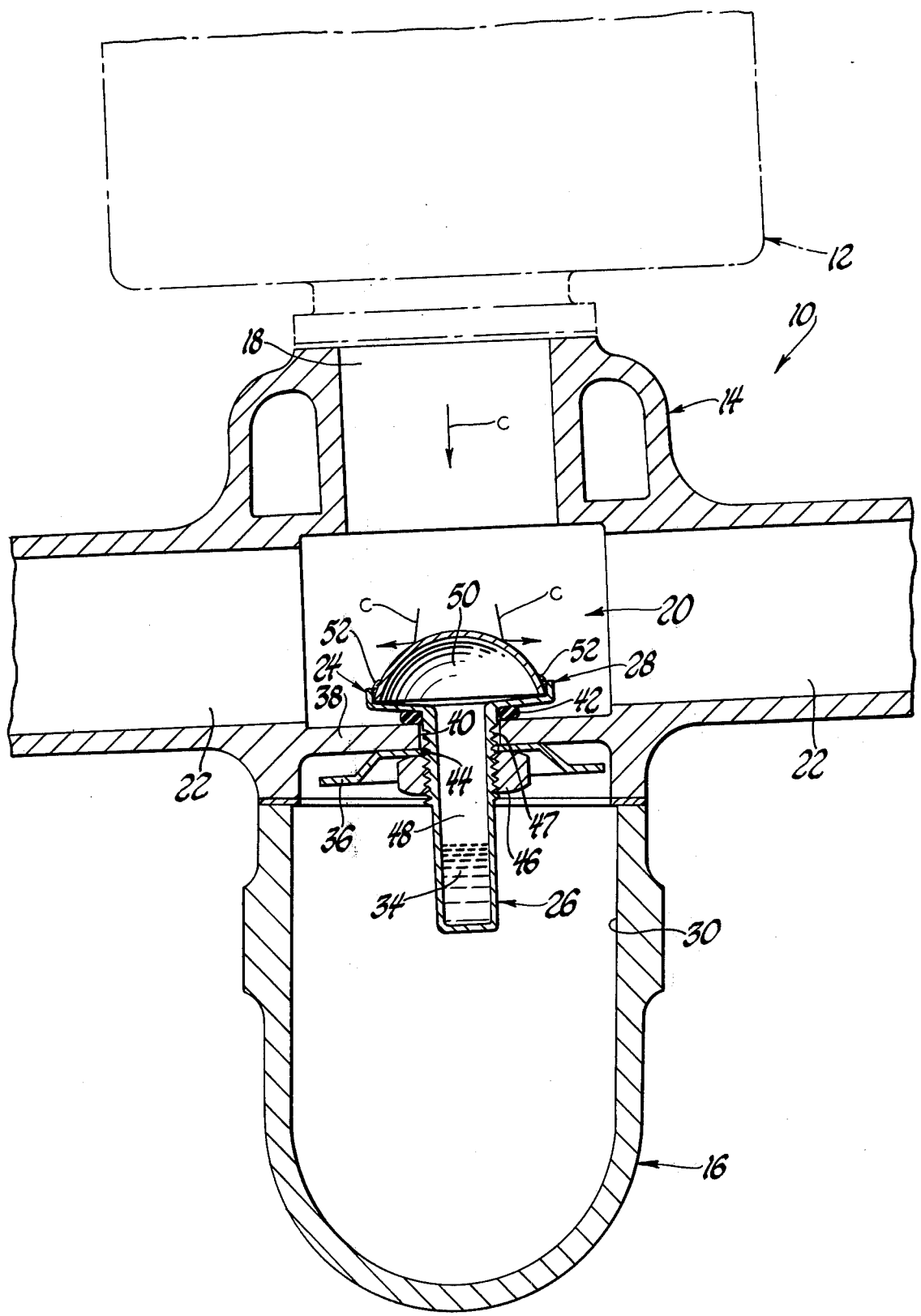

MANIFOLD HEAT EXCHANGER

BACKGROUND OF THE INVENTION

1. Field of the Invention

The present invention relates to an improved manifold heat exchanger for an internal combustion engine.

2. Description of the Prior Art

Internal combustion engines have heretofore included manifold heat exchangers for transferring heat from exhaust gases flowing through an exhaust manifold to a combustible charge flowing through an intake manifold. Heating of the charge to combustion enhances the initial engine performance during cold weather.

U.S. Pat. Nos. 2,108,639, 2,651,507 and 2,725,862 disclose manifold heat exchangers for internal combustion engines wherein temperature responsive valves control the heat transfer between the exhaust and intake manifolds. These valves have been necessary with prior art manifold heat exchangers in order to terminate the heating of the combustible charge once steady state operating temperatures have been reached. Otherwise, the exhaust gases would transfer too much heat to the combustible charge within the intake manifold during steady state operation with these prior art manifold heat exchangers.

Also U.S. Pat. Nos. 2,251,630, 2,252,972 and 2,936,746 disclose other intake manifold heaters. The manifold heater of the U.S. Pat. No. 2,251,630 incorporates an electric heating element disposed within the intake manifold to warm the combustible charge. The manifold heater of the U.S. Pat. No. 2,252,972 passes air through a closed conduit within the exhaust manifold and then feeds this air to the intake manifold downstream from a carburetor that feeds the intake manifold. The manifold heater of the U.S. Pat. No. 2,936,746 utilizes the engine coolant to heat the intake manifold. This coolant is present in a liquid state as it performs its heat exchange function during engine operation.

SUMMARY OF THE INVENTION

The present invention is directed toward an improved manifold heat exchanger for an internal combustion engine wherein the heat exchanger includes an enclosed liquid receptacle having portions disposed in both the exhaust and intake manifolds of the engine and wherein a quantity of liquid partially fills the liquid receptacle. The receptacle portion disposed in the exhaust manifold functions as a heat receiving portion that receives heat from the exhaust gases to vaporize the liquid within the receptacle. The portion of the liquid receptacle disposed in the intake manifold acts as a heat dissipating portion that receives heat from the vaporized liquid and utilizes this heat to warm the combustible charge flowing within the intake manifold.

Each receptacle portion preferably projects into the manifold in which it is disposed. The heat receiving portion of the receptacle is preferably located below the heat dissipating portion thereof so the unvaporized liquid normally flows to the heat receiving portion under the influence of gravity. The heat dissipating portion of the receptacle has a partially spherical configuration that is impinged by the combustible charge as it enters the intake manifold to provide the heating of the charge. The heat receiving portion of the receptacle has an elongated tubular configuration that extends downwardly into the exhaust manifold and gives the liquid receptacle a mushroom shape.

A heat shield within the exhaust manifold concentrates the heat transfer from the exhaust gases to the heat receiving portion of the receptacle. This heat shield is secured to the manifolds by an attachment member that also secures the liquid receptacle in position. The common attachment member engages the heat shield adjacent an aperture of the shield through which the heat receiving portion of the receptacle projects downwardly into the exhaust manifold. The attachment member clamps the shield in engagement with a lower side of the manifold wall.

As disclosed, the liquid utilized is water and the liquid receptacle is made with a two-piece construction from stainless steel. A lower member of the receptacle defines the heat receiving portion and the lower extremity of the heat dissipating portion. An upper member of the receptacle defines the upper spherical shape of the heat dissipating portion.

Testing has shown that the manifold heat exchanger of the present invention decreases the level of hydrocarbons, carbon monoxide, and oxides of nitrogen in the exhaust gases during engine warm-up and during steady state operation. Additionally, fuel economy is also improved by this manifold heat exchanger.

The objects, features and advantages of the present invention are readily apparent from the following detailed description of the preferred embodiment taken in connection with the accompanying drawing.

BRIEF DESCRIPTION OF THE DRAWING

The single FIGURE of the drawing illustrates an internal combustion engine manifold heat exchanger which embodies the present invention.

DETAILED DESCRIPTION OF THE PREFERRED EMBODIMENT

Referring to the single FIGURE of the drawing, reference numeral 10 indicates a portion of an internal combustion engine which includes an phantom line indicated carburetor 12, an intake manifold 14, and an exhaust manifold 16 located below the intake manifold. The intake manifold mounts the lower side of the carburetor 12 and includes a vertical intake passage 18 that receives a combustible charge C from the carburetor. A manifold heat exchanger 20 that embodies the present invention heats the combustible charge as it flows from the intake passage 18 to a pair of horizontally extending passages 22 that distribute the charge to the engine cylinders. This heating occurs as the charge impinges with the heat exchanger and is then deflected for flow through the passages 22 as shown by the bent arrows C.

The heat exchanger 20 includes an enclosed liquid receptacle 24 of a mushroom shape that has a heat receiving portion 26 and a heat dissipating portion 28, these portions 26 and 28 being respectively disposed in the exhaust and intake manifolds. The heat receiving portion 26 of the receptacle projects downwardly into an exhaust passage 30 of the exhaust manifold 16. The heat dissipating portion 28 of the receptacle projects upwardly into the intake manifold 14 at the juncture of its intake passage 18 with the distributing passages 22.

The manifold heat exchanger receptacle 24 receives a quantity of liquid 34, such as water, that partially fills the interior of this receptacle. During engine operation, exhaust gases flowing over the heat receiving portion 26 of the heat exchanger receptacle cause the liquid 34 to vaporize. The vaporized liquid flows upwardly into the heat dissipating portion 28 of the receptacle and then condenses so as to transfer heat to the combustible charge that impinges with the heat exchanger prior to being distributed to the engine for combustion. The condensed liquid then forms droplets on the interior wall of the heat dissipating portion of the receptacle. These droplets flow downwardly on the interior receptacle wall due to gravity to the heat receiving portion of the receptacle which heats and revaporizes the droplets so as to repeat the heat exchange process.

The heating of the combustible charge occurs very rapidly and enhances engine warm-up before steady state operating temperatures have been reached. Except for the condensed droplets, all of the liquid within the receptacle becomes vaporized very quickly to provide this rapid heating. The time period during which the engine must operate under choke conditions is shortened by this rapid heating. Hydrocarbons and carbon monoxide are present more abundantly during engine operation under choke conditions and the accelerated manner in which the heat exchanger 20 terminates the necessity for this choke operation thus is advantageous. Also, the heat exchanger continues to provide its heat exchange function during steady state operation without transferring too much heat to the combustible charge so as to reduce the engine efficiency. Thus, there is no absolute requirement for a thermostatically controlled valve to terminate the heating of the charge once the steady state engine operating temperature has been reached as with prior art manifold heat exchangers. Furthermore, testing has shown that, during warm-up and steady state operation, the manifold heat exchanger decreases the level of hydrocarbons, carbon monoxide, and oxides of nitrogen in the exhaust gases as well as increasing fuel economy.

The heat receiving portion 26 can be located below the heat dissipating portion 28 due to the fact that the intake manifold 14 is located above the exhaust manifold 16 in the engine shown. Consequently, the force of gravity causes the condensed liquid droplets to normally flow downwardly into the heat receiving portion 26 of the liquid receptacle for reheating. However, it should be pointed out that the heat exchanger 20 may also be utilized with an engine whose exhaust manifold is positioned above the intake manifold. In such an engine, the heat exchanger would have to incorporate a wick through which the liquid within the receptacle would flow upwardly to the heat receiving portion against gravity so as to be vaporized by the heat transfer from the exhaust gases.

A heat shield 36 is located within the exhaust passage 30 of the exhaust manifold and concentrates the heat transfer from the exhaust gases to the heat receiving portion 26 of the liquid receptacle. This heat shield prevents the exhaust gases fromm initially heating a common manifold wall 38 located between the intake and exhaust manifolds. The manifold wall 38 defines an aperture 40 through which the heat receiving portion 26 projects downwardly into the exhaust manifold. An O-ring 42 located within the intake manifold encircles the heat exchanger above the aperture 40 and positions the enlarged heat dissipating portion 28 of the liquid receptacle in its upwardly spaced position shown. Below the aperture 40, the heat shield 36 has a dishshaped configuration and defines a central aperture 44 through which the heat receiving portion 26 extends downwardly into the exhaust manifold passage 30. An attachment member such as the nut 46 shown securely mounts both the liquid receptacle 24 and the heat shield 36 on the manifold wall 38. This nut is threaded onto threads 47 that provide an attachment portion of the receptacle. The attachment nut clamps the heat shield 36 against the lower side of the manifold wall 38 and compresses the O-ring 42 on the upper side of this wall.

The liquid receptacle 24 shown is made with a two-piece construction from stainless steel. A stainless steel lower member 48 of the receptacle is stamped to define the heat receiving portion 26 and the lower extremity of the heat dissipating portion 28 within the intake manifold. A stainless steel upper member 50 of the liquid receptacle has a partially spherical shape that is impinged by the combustible charge C received from the carburetor. This spherical shape of the heat dissipating portion gives it good heat transfer capability for rapid heating of the charge during early stages of the engine operation. The peripheral edge of the upper member 50 is sealed to the lower member 48 by a continuous weld 52. Also, the heat receiving portion 26 has an elongated tubular shape with a hollow circular cross-section that projects downwardly into the exhaust manifold passage 30. This configuration of the heat receiving portion and the cooperable heat shield 36 cause a rapid heat exchange between the exhaust gases and the combustible charge to facilitate early engine operation. The degree to which the heat receiving portion 26 projects downwardly into the exhaust manifold controls the amount of heat that is transferred to the intake manifold from the exhaust gases. Thus, the heat receiving portion 26 must be long enough so as to provide sufficient heating of the combustible charge but must not be too long so as to overheat the charge after steady state operating temperatures have been reached. The proper length for the heat receiving portion will thus depend on the particular carburetor-manifold configuration with which the heat exchanger is utilized.

Also, liquids other than water may be utilized as the liquid of the heat exchanger. The only requirement is that the liquid have a vaporization temperature that enables the liquid to function as a heat exchange medium in the manner described at engine operating temperatures. Freon is another example of such a liquid.

While a preferred embodiment of the manifold heat exchanger has herein been described in detail, those skilled in the art will recognize various alternatives, designs and embodiments for practicing the present invention as defined by the following claims.

What is claimed is:

1. In an internal combustion engine including an intake manifold for distributing a combustible charge and an exhaust manifold for receiving exhaust gases, and a wall between said manifolds and having an opening therethrough, a manifold heat exchanger comprising: an enclosed liquid receptacle of a mushroom shape having an elongated heat receiving portion of a predetermined length disposed in the exhaust manifold and a partially spherical heat dissipating portion disposed in the intake manifold; said heat receiving portion of the receptacle extending through said manifold wall opening and having a cross section of a smaller size than the diameter of the partially spherical heat dissipating portion thereof; and a quantity of liquid received within and partially filling the receptacle, the liquid within the receptacle being vaporized by heat from exhaust gases flowing through the exhaust manifold over the predetermined length of the elongated heat receiving portion of the receptacle, and the vaporized liquid transferring heat to the partially spherical heat dissipating portion of the receptacle so as to heat the combustible charge as the charge impinges with the partially spherical shape thereof within the intake manifold.

2. A heat exchanger as in claim 1 wherein the heat receiving portion of the receptacle is located below the heat dissipating portion thereof so the unvaporized liquid is normally received within the heat receiving portion due to gravity.

3. A heat exchanger as in claim 1 wherein the elongated heat receiving portion of the receptacle has a tubular configuration.

4. A heat exchanger as in claim 1 wherein the exhaust manifold includes a heat shield for concentrating heat transfer from the exhaust gases to the heat receiving portion of the receptacle.

5. A heat exchanger as in claim 1 wherein the receptacle is made from stainless steel and the liquid is water.

6. A heat exchanger as in claim 1 wherein the receptacle includes an attachment portion for mounting the heat exchanger.

7. A heat exchanger as in claim 6 wherein an attachment member engages the attachment portion of the receptacle to mount the heat exchanger.

8. A heat exchanger as in claim 7 wherein a heat shield within the exhaust manifold is secured by the attachment member and concentrates heat transfer from the exhaust gases to the heat receiving portion of the receptacle.

9. In an internal combustion engine including an upper intake manifold for distributing a combustible charge and a lower exhaust manifold for receiving exhaust gases, and a wall between said manifolds and having an opening therethrough, a manifold heat exchanger comprising: an enclosed liquid receptacle of a mushroom shape having an elongated heat receiving portion of a tubular shape with a predetermined length projecting downwardly into the exhaust manifold and an enlarged heat dissipating portion of a partially spherical shape located at the upper end of the heat receiving portion within the intake receptacle; the partially spherical shape of the heat dissipating portion being impinged by the combustible charge entering the intake manifold; said heat receiving portion of the receptacle extending through said manifold wall opening and having a cross section of a smaller size than the diameter of the partially spherical heat dissipating portion thereof; and a quantity of liquid received within and partially filling the receptacle, the liquid normally being located within the heat receiving portion of the receptacle due to gravity and being vaporized by heat from exhaust gases flowing through the exhaust manifold over the predetermined length of the elongated heat receiving portion of the receptacle, and the vaporized liquid transferring heat to the partially spherical heat dissipating portion of the receptacle so as to heat the combustible charge as the charge impinges with the partially spherical shape thereof within the intake manifold.

10. A heat exchanger as in claim 9 that also includes a heat shield having an aperture through which the heat receiving portion of the receptacle projects, the heat shield concentrating heat transfer from the exhaust gases to the heat receiving portion of the receptacle.

11. A heat exchanger as in claim 10 wherein the heat shield and the receptacle are securely mounted on the manifolds by a common attachment member.

12. A heat exchanger as in claim 10 wherein the liquid receptacle is stainless steel and includes a lower member defining the heat receiving portion and the lower extremity of the enlarged heat dissipating portion as well as including an upper partial spherical member that defines the upper spherical shape of the heat dissipating portion.

13. An internal combustion engine manifold heat exchanger comprising: an enclosed receptacle of a mushroom shape adapted to extend between the intake and exhaust manifolds of an internal combustion engine through an opening in a wall between the manifolds; the receptacle including an elongated heat receiving portion of a tubular shape with a predetermined length adapted to be disposed in the exhaust manifold as well as a partially spherical heat dissipating portion adapted to be disposed in the intake manifold to be impinged by a combustible charge flowing thereinto; said heat receiving portion of the receptacle being adapted to extend through the manifold wall opening and having a cross section of a smaller size than the diameter of the partially spherical heat dissipating portion thereof; and a quantity of liquid received within and partially filling the receptacle, the liquid within the receptacle being vaporized by heat from exhaust gases flowing through the exhaust manifold over the predetermined length of the elongated heat receiving portion of the receptacle, and the vaporized liquid transferring heat to the partially spherical heat dissipating portion of the receptacle so as to heat the charge as the charge impinges with the partially spherical shape thereof within the intake manifold.

* * * * *